United States Patent [19]

Filidei

[11] Patent Number: 4,504,140

[45] Date of Patent: Mar. 12, 1985

[54] CAMERA FILTER HOLDERS

[76] Inventor: Nilo R. Filidei, 201 Remsen Ave., Avenel, N.J. 07001

[21] Appl. No.: 5,838

[22] Filed: Jan. 23, 1979

[51] Int. Cl.³ ............................................. G03B 27/72
[52] U.S. Cl. ................................................... 355/71
[58] Field of Search .......................... 355/71; 354/295; 350/318, 257, 58–60, 579–581

[56] References Cited

U.S. PATENT DOCUMENTS

2,420,379  5/1947  Mills ................................ 350/318 X

*Primary Examiner*—Gene Z. Rubinson
*Assistant Examiner*—W. J. Brady

[57] ABSTRACT

Filter holders and system are referred to as Fili-holders or Fili-holder system on the title page and all hereafter, so as not to be confused with any existing filter holding methods.

A desired square filter is inserted into a Fili-holder and is placed on a copy camera lens collar as a unit. This eliminates the need and current use of a permanently mounted filter holder to the copy camera lens and the problems inherent from same.

1 Claim, 10 Drawing Figures

CAMERA FILTER HOLDERS

DESCRIPTION

DETAILED DESCRIPTION

Figure 6:
FIG. 6 is a right side view of the gravity hold type of Fili-holder, with a mounted filter inserted and ready for use.

To be used for: Lithographic photography and photography in general, where applicable. Invented to hold square filters on horizontal (FIGS. 6 and 7) and vertical copy cameras, without the use of a permanently mounted filter holder on the camera lens.

Figure 5:
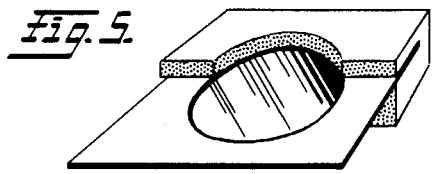
FIG. 5 is a front perspective view of the gravity hold type of Fili-holder, with a mounted filter inserted and ready for use.
Figure 7:
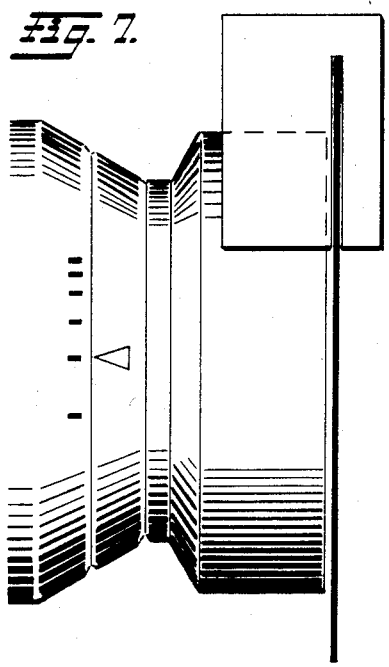
FIG. 7 is a right side view thereof, showing how it is positioned on the lens collar, which is similar on all the three variations of Fili-holders.
Figure 8:
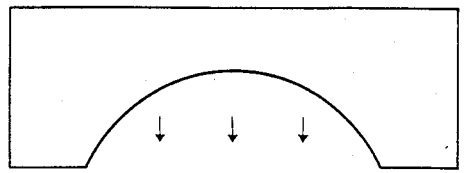
FIG. 8 is a rear plan view of the gravity hold type of Fili-holder with arrows denoting the force that holds it in position.
Figure 9:
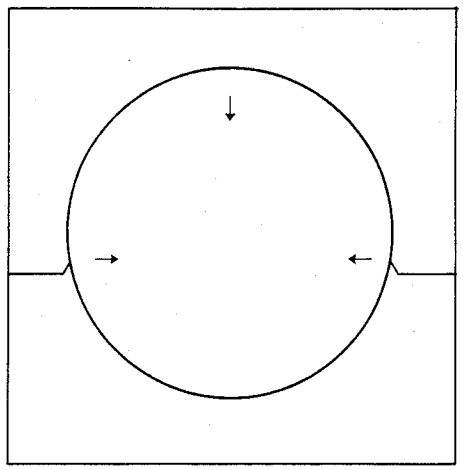
FIG. 9 is a rear plan view of the clamp hold type of Fili-holder thereof.
Figure 10:
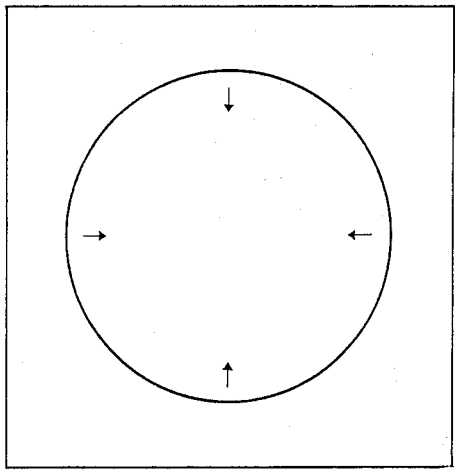
FIG. 10 is a rear plan view of the cap hold type of Fili-holder thereof.

How used: The filter is inserted into a Fili-holder (FIG. 5) and is placed on the camera lens collar as a unit (FIG. 7), eliminating the use and need of a permanently mounted, awkward, filter holder. It positions filter safely, as close and tight as possible to the lens (FIG. 7).

Figure 1:
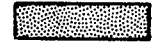
FIG. 1 is the texture used in the perspective views of the Fili-holders, to denote styrofoam.
Figure 2:
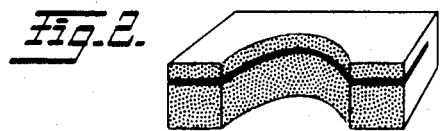
FIG. 2 is a front perspective view of the gravity hold type of Fili-holder.
Figure 3:
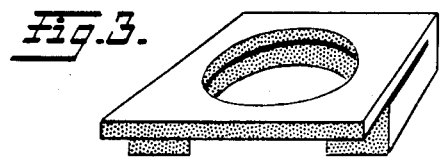
FIG. 3 is a front perspective view of the clamp hold type of Fili-holder.
Figure 4:
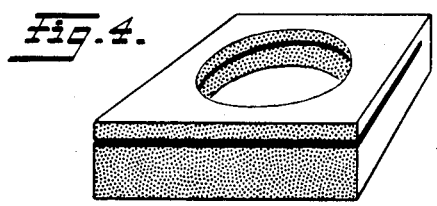
FIG. 4 is a front perspective view of the cap hold type of Fili-holder.

Material: To be manufactured (cut or molded) from any lightweight, non-abbrasive material (for lens safety), i.e. Styrofoam (FIG. 1), foam rubber, plastic. Recommended color: Black or dary grey (to eliminate possible glare).

Size: No overall size specified, as it will vary greatly with miscellaneous lens and filter sizes in use.

Thickness: Approximately 1" (FIG. 6), divided accordingly; $\frac{1}{4}$" from slot, to grasp filter and $\frac{3}{4}$" from slot, to grasp lens collar (FIG. 7).

Having thus described my invention, what I claim is:

1. Filter holders for square filters fabricated in one, solid piece measuring the width of a square filter, with circular opening the size of a copy camera lens to be used on, with a tight fitting slot substantially cut through the height of said holders, whereby the remaining un-slotted area at the top to act as a top closure and stop for mounted square filters to be inserted and held in place by the tightness of the slot, said slot to be positioned at approximately one quarter the thickness of said holders from front to back thereby allowing the remaining three quarters of the total thickness of said holders for a means to grasp the lens collar, and the mounted square filters themselves when inserted into said holders act as final positioning in front of lens, by slightly pushing said holders against the front of the lens collar rim.

* * * * *